United States Patent [19]

Pflug et al.

[11] Patent Number: 4,750,961
[45] Date of Patent: Jun. 14, 1988

[54] DEFORMABLE RESIN LAMINATE SHEET METHOD OF SHAPING

[75] Inventors: Guenther Pflug, Vienna; Georg Petershofer, Wiener Neudorf, both of Austria

[73] Assignee: Isovolta Isterreichische Isolierstoffwerke Aktiengesellschaft, Wiener Neudorf, Austria

[21] Appl. No.: 99,556

[22] Filed: Sep. 22, 1987

Related U.S. Application Data

[60] Division of Ser. No. 708,373, Mar. 6, 1985, which is a continuation of Ser. No. 441,429, Nov. 15, 1982, abandoned, which is a division of Ser. No. 915,577, Jun. 15, 1978, abandoned.

[30] Foreign Application Priority Data

Jun. 20, 1977 [AT] Austria .................................. 4317/77

[51] Int. Cl.⁴ .......................... B31F 1/00; C09J 3/14; B29B 1/00
[52] U.S. Cl. ...................................... 156/212; 156/221; 156/330.9; 264/242; 264/296; 428/474.4
[58] Field of Search ............... 156/212, 215, 219, 220, 156/221, 222, 245, 288, 309.6, 323, 330.9, 335, 331.8, 331.2; 264/241, 242, 258, 294, 296, 519, 522, 544, 548; 428/163, 172, 179, 181, 474.4, 475.2, 476.3, 479.3, 479.6

[56] References Cited

U.S. PATENT DOCUMENTS

| | | | |
|---|---|---|---|
| 2,956,916 | 10/1960 | Voss et al. | 264/258 |
| 3,296,056 | 1/1967 | Bechtold | 156/212 |
| 3,378,433 | 4/1968 | Palazzolo et al. | 428/302 |
| 3,556,915 | 1/1971 | Stanley et al. | |
| 3,668,033 | 6/1972 | Evans | 156/212 |

Primary Examiner—Donald E. Czaja
Assistant Examiner—Louis Falasco
Attorney, Agent, or Firm—Bierman and Muserlian

[57] ABSTRACT

A heat shapable resin laminate sheet, composed of several heat-bonded support webs impregnated with duroplastic binders, the deformation temperature to be utilized in shaping the laminate sheet being higher than the temperature utilized in molding it, which comprises a number of individual laminations, each of which is formed separately of one or more support webs impregnated with duroplastic binders and layers of thermoplastic binders arranged between the individual laminations, the melting point temperatures of the thermoplastic binders being equal to or lower than the deformation temperature, and a process of shaping the laminate sheet.

6 Claims, 3 Drawing Sheets

FIG. 1
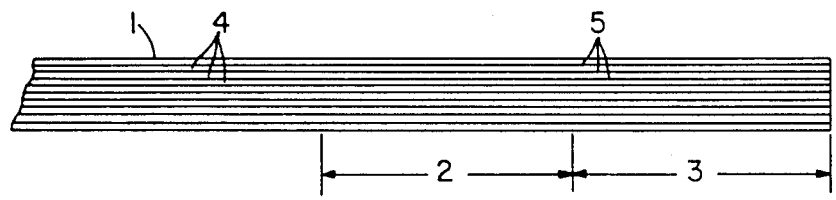
FIG. 2
FIG. 3
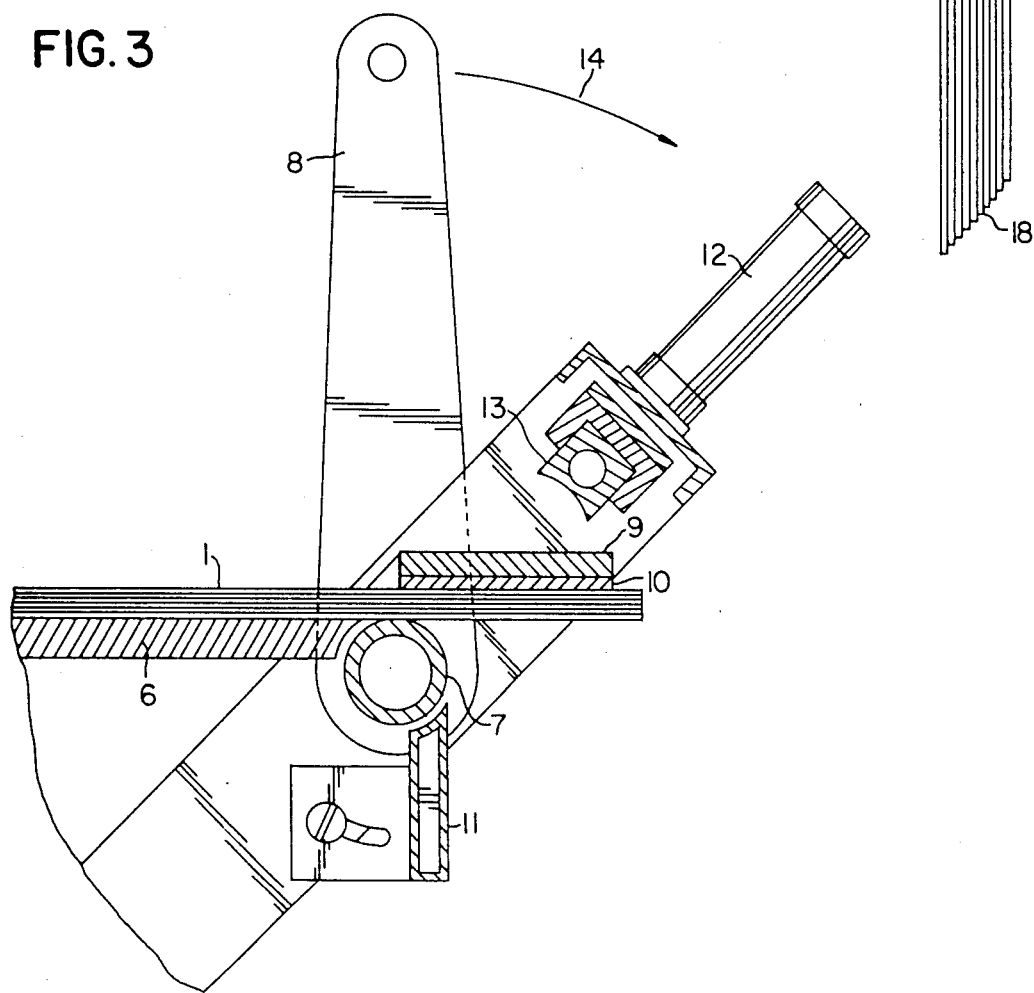

DEFORMABLE RESIN LAMINATE SHEET METHOD OF SHAPING

PRIOR APPLICATIONS

This application is a division of copending U.S. patent application Ser. No. 708,373 filed Mar. 6, 1985 which is a continuation of U.S. patent application Ser. No. 441,429 filed Nov. 15, 1982, now abandoned which is a divison of U.S. patent application Ser. No. 915,577 filed June 15, 1978, now abandoned.

FIELD OF THE INVENTION

The invention relates to deformable resin laminate sheets, which advantageously can have a decorative surface and are suitable for making objects having rounded surfaces as well as a method for shaping these sheets.

THE RELATED ART

In recent years, an increasing trend has been observed in the furniture industry and in the production of decorative structures toward the production of forms which have rounded edges.

For structures of this kind, which have a decorative surface, so-called resin laminate sheets of the "post-forming" grade are being used more and more. These resin laminate sheets will be designated as postforming sheets in the following discussion. These sheets consist of several support webs, in particular paper webs, bonded while hot and impregnated with duroplastic binders, said binders being not yet fully hardened after the bonding. The sheets can be brought into their final form by heating and bending over a jig. Because of the low ultimate elongation of the impregnated paper, the radii attainable by bending are not less than about 8 to 10 times the sheet thickness. For this reason, among others, the postforming sheets have in practice a thickness of 0.8–1.2 mm and with these thicknesses they cannot be used as a self-supporting material in most applications but must generally be bent first and then glued to a correspondingly shaped support.

OBJECTS OF THE INVENTION

An object of the present invention was therefore to provide a deformable resin laminate sheet which can be shaped so that the radii formed by bending of the sheet have the magnitude of the sheet thickness and so that the shaped sheets obtained can advantageously be used as self-supporting structural elements.

Another object of the present invention was to provide a deformable resin laminate sheet which is composed of several individual laminations, each of which is formed separately of one or more support webs impregnated with duroplastic binders, and of layers of thermoplastic binders, arranged between the individual laminations, the melting temperature of the thermoplastic binders being equal to or lower than the deformation temperature of the laminate sheet.

A further object of the present invention was to provide a method for shaping the deformable resin laminate sheet of the invention, which comprises the steps of (a) heating the deformable resin laminate sheet of the invention, the heat being applied at least in the area where the sheet is to be deformed, to a temperature equal to or higher than the melting point temperature of the thermoplastic binder, (b) thereupon bending the sheet within the deformation area in a bending device around at least one cylindrical surface, whereby the laminations of the sheet shift relatively to each other in the deformation area in the direction of the sheet surface and (c) cooling the sheet after termination of the bending process, provided that, during and/or after shaping and at least until the binder resolidifies during cooling, separation of the joints formed by the binder is prevented by form-holding elements of the bending device.

These and other objects of the present invention will become more apparent as the description thereof proceeds.

THE DRAWINGS

FIG. 1 is a side view of an edge segment of the deformable resin laminate sheet;

FIG. 2 is a side view of the edge segment of FIG. 1 after bending;

FIG. 3 is a side vertical cross-sectional view of a bending device used for the shaping process of the invention and of an edge segment of the deformable resin laminate sheet;

DESCRIPTION OF THE INVENTION

Figure 4:
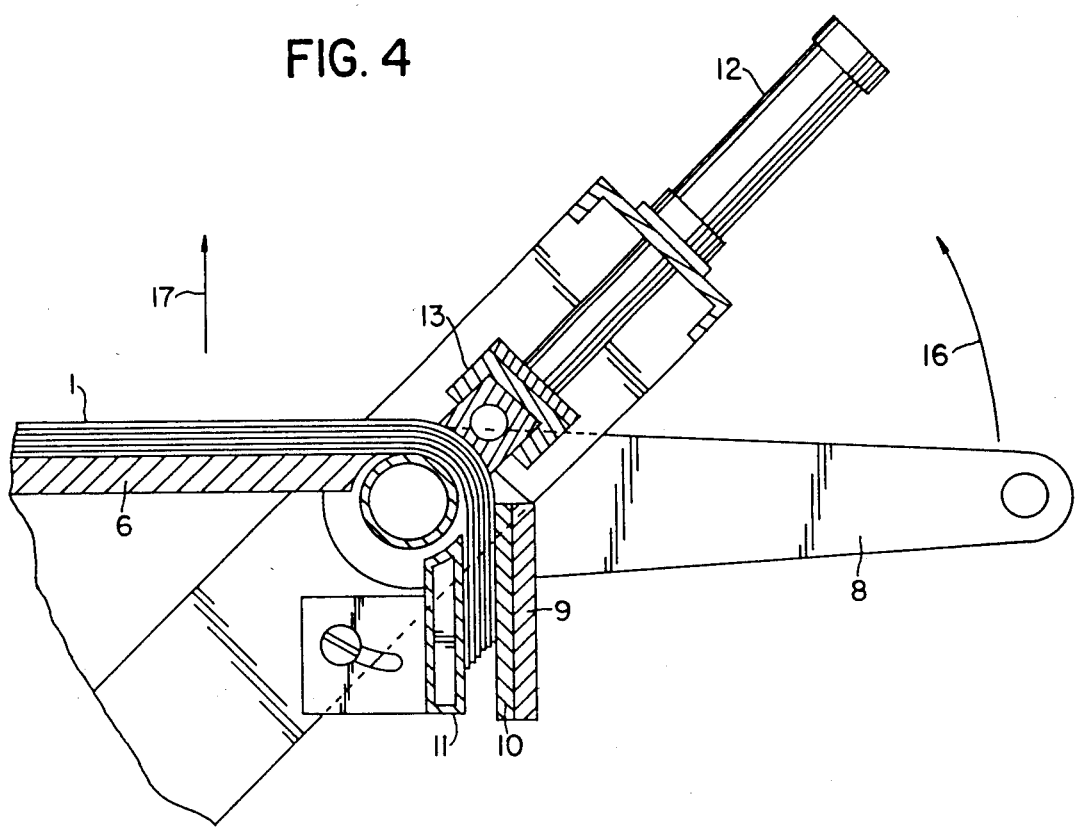
FIG. 4 is a side vertical cross-sectional view of the bending device and edge segment of FIG. 3 after bending.

The above objects of the invention have been achieved and the drawbacks of the prior art overcome by the production of a deformable resin laminate sheet, which comprises several individual laminations, each of which is formed separately of one or more support webs impregnated with duroplastic binders, and of layers of thermoplastic binders, arranged between the single laminations, the melting temperature of the thermoplastic binders being equal to or lower than the deformation temperature of the resin laminate sheet More particularly, the invention relates to the production of a heat-shapable resin laminate sheet, composed of several heat-bonded support webs impregnated with duroplastic binders, the deformation temperature to be utilized in shaping the laminate sheet being higher than the temperature utilized in molding it, which comprises a number of individual laminations, each of which is formed separately of one or more support webs impregnated with duroplastic binders, and layers of thermoplastic binders arranged between the individual laminations, the melting point temperatures of the thermoplastic binders being equal to or lower than the deformation temperature.

The thermoplastic binder can advantageously be a non-hardening melt adhesive, prefably a polyamide-based, or a novolac-based binder, or it can advantageously consist of an acrylonitrile-butadiene-styrene copolymer of of a polyester. The support webs can be any of those materials customarily used in postforming sheets as e.g. paper webs. The invention is adapted to be used with any suitable organic duroplastic or heat hardenable binder. Suitable duroplastic binders are, for example, phenoplasts, such as resoles, novolacs, etc., and aminoplasts, such as urea-formaldehyde resins, melamine-form-aldehyde resins, etc., and mixtures thereof.

The present invention also relates to a process for the shaping of the deformable resin laminate sheet of the invention, which comprises the steps of (a) heating the deformable resin laminate sheet, the heat being applied at least in the area where the sheet is to be shaped, to a temperature equal to or higher than the melting point temperature of the thermoplastic binder, (b) thereupon bending the sheet within the deformation area in a bending device around at least one cylindrical surface, whereby the laminations of the sheet shift relatively to each other in the deformation area in the direction of the sheet surface, and (c) cooling the sheet after termination of the bending process, provided that during and/or after shaping and at least until the binder resolidifies during cooling, separation of the joints formed by the binder is prevented by formholding elements of the bending device.

In an advantageous embodiment of the invention wherein the heat shaping process is accomplished by the bending at an angle of an edge zone of the sheet, the area being shaped is formed from the bending area and the edge-zone of the sheet being bent at an angle.

In another advantageous embodiment of the shaping method of the invention, the area of the sheet being shaped does not coincide with the sheet edges at two places which are at least substantially parallel to each other, and the shaping in the deformation area occurs by bending around two cylindrical surfaces, the generatrices of which are parallel to each other or, respectively, to the parallel places located in the deformation area of the sheet, provided that, at least after the termination of the bending process, in a cross-section extending normal to the bending surface generatrices, on the one hand, the sum of the direction changes caused by the deformation is zero at each of the two cross-section contours and, on the other hand, the total lengths of the deformed lamination areas are the same for each lamination.

Figure 5:
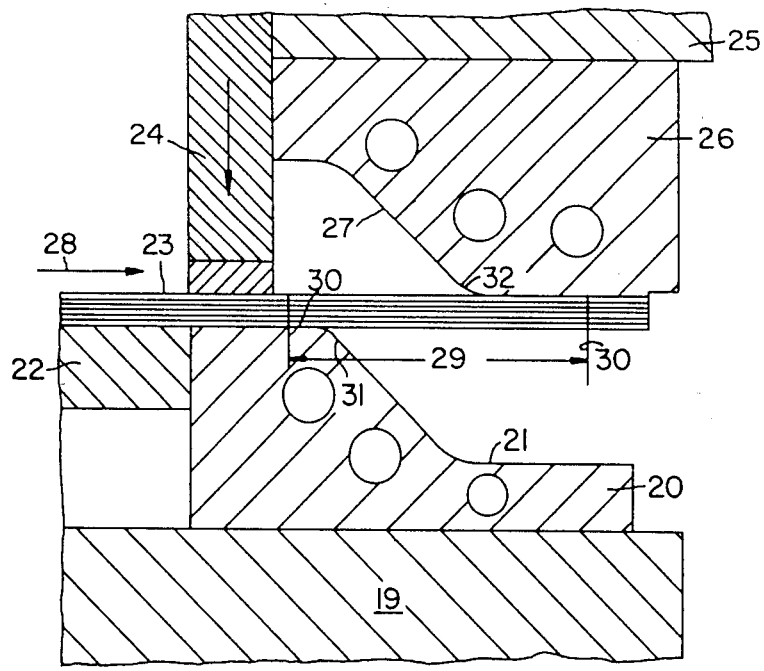
FIG. 5 is a side vertical cross-sectional view of another bending device used for the shaping process of the invention and of an edge segment of the deformable resin laminate sheet.
Figure 6:
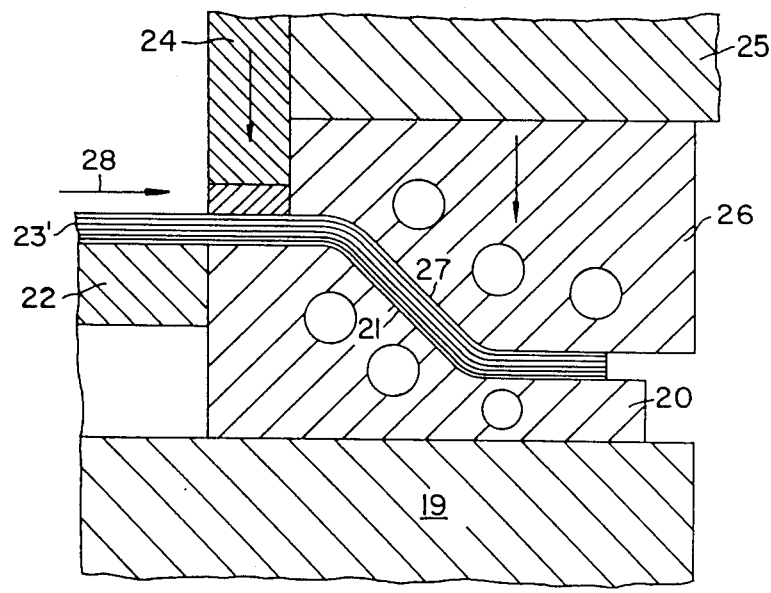
FIG. 6 is a side vertical cross-sectional view of the bending device and edge segment of FIG. 5 after bending.

The invention will now be more particularly described at length below, with reference to preferred embodiments of the invention and to the figures of the accompanying drawings, in which:

FIG. 1 is a side view of an edge segment of the deformable resin laminate sheet;

FIG. 2 is a side view of the edge segment of FIG. 1 after bending;

FIG. 3 is a side vertical cross-sectional view of a bending device used for the shaping process of the invention and an edge segment of the deformable resin laminate sheet;

FIG. 4 is a side vertical cross-sectional view of the bending device and edge segment of FIG. 3 after bending;

FIG. 5 is a side vertical cross-sectional view of another bending device used for the shaping process of the invention and of an edge segment of the deformable resin laminate sheet;

FIG. 6 is a side vertical cross-sectional view of the bending device and edge segment of FIG. 5 after bending.

In the following example there is described a preferred embodiment to illustrate the invention. However, it should be understood that the invention is not intended to be limited to the specific embodiments.

For the manufacture of a resin laminate sheet according to the invention the following structural elements are used in the example described below:

a. Decorative papers having a base weight of 100 gm/m$^2$, impregnated with a melamine resin with a resin application of about 140 gm/m$^2$.

b. Barrier papers (180 gm/m$^2$), impregnated with a phenol resin with a resin application of about 70 gm/m$^2$.

c. Core papers (180 gm/m$^2$), impregnated with a phenol resin with a resin application of about 70 gm/m$^2$.

d. Polyamide melt adhesive sheet (supporting film) of a 30 micron thickness.

The resins used for impregnating the above-mentioned papers are so-called "postforming resins", which do not become fully hardened during the hot molding of the sheets.

The use of the above-mentioned sheet elements will now be more fully described by way of the following specific example.

For the manufacture of a sheet of 10 mm thickness, a symmetrically arranged stack is assembled from the above-mentioned sheet elements. The stack is arranged in such a way that the papers or support webs, which have been impregnated with the melamine or phenol resin, form ten groups of five papers each, a melt adhesive sheet being inserted between adjacent groups. The two outer paper layer groups containeach starting from a stack outer surface-a decorative paper, a barrier paper, and three core papers, while the 8 inner groups consist of five core papers each. The thus assembled stack is then hot molded by the customary method employed in manufacturing resin laminate sheets. A sheet is thereby formed which consists of several laminations formed by the individual paper layer groups, said laminations being bonded together by layers of a thermoplastic binder. It is advantageous to perform the above hot molding operation at a molding sheet temperature which is below the melting point temperature of the thermoplastic binder but is at least equal to the temperature at which a satisfactory adhesiveness is imparted to the binder due to the occurrence of sufficient softening. In the example carried out in accordance with the present invention the molding sheet temperature was about 130°-140° C.

FIG. 1 shows in a side view an edge segment of a deformable resin laminate sheet 1 produced in accordance with the above described procedure. For the bending at an angle of an edge zone of sheet 1, a bending area 2 and the edge zone 3 to be bent at an angle are heated to a temperature above the softening temperature of the thermoplastic binder layers 5 connecting the individual laminations 4. In the case of the above described sheet, area 2 and edge zone 3 were heated to 160°-170° C. Thereafter, as is explained in greater detail below, sheet 1 is bent in a bending device e.g. by 90° C., so that the bent sheet finally assumes the form shown in FIG. 2.

FIGS. 3 and 4 show schematically in a cross-sectional view a bending device useful for carrying out an embodiment of the bending process of the invention in a partial representation, in two different stages of the bending process according to the invention.

The bending device is mounted on a frame and firmly connected therewith. It contains a supporting table 6 and a bending mandrel 7, and also a bending toggle 8 rotatably mounted on the frame, with a bending plate 9 and a sliding liner 10 and a counter-pressure plate 11 adjustably secured on the frame, as well as a ledge type die 13 movable by a hydraulic cylinder 12. The mandrel 7, counter-pressure plate 11 and die 13 are hollow and traversed by a cooling medium.

To bring about the bending of the laminated sheet, a border portion of the sheet is first heated as described above with reference to FIG. 1, and the sheet with the heated border area is then introduced into the bending device, as shown in FIG. 3. The bending toggle 8 is next rotated in the direction of arrow 14 into the position shown in FIG. 4. Sheet 1 is thereby bent by the joint action of the mandrel 7 and the bending plate 9 with sliding liner 10. Because of the softening of the binder layers 5, the individual laminations 4 can slide along each other in the direction of the sheet surface in an unhindered fashion. After the complete pivoting of the toggle 8, the first result is that, on the one hand, the bent edge zone of the sheet is retained between the liner 10 of the bending plate 9 and the counter-pressure plate 11 with slight area type compression, and on the other hand, is further retained by extension of the hydraulic cylinder 12, the ledge type die 13 being pressed against the convex surface of the bent sheet area.

After being bent at an angle, the border portion of the sheet, which has been heated in order to effect its deformation, is held in the position shown in FIG. 4 so that separation of the binder joints is prevented. The heated sheet area is allowed to cool in this position, at least until the thermoplastic binder resolidifies. The cooling is accelerated by the cooling medium circulating in the mandrel 7, the counter-pressure plate 11, and the die 13.

After cooling of the sheet, die 13 is pulled back by slight counter-pivoting of the toggle in the direction of arrow 16. The compression in the zone where the angle has been formed is thereby released, and, lastly, the sheet is lifted off the bending device in the direction of arrow 17.

In a further step in the production of the shaped resin laminate sheet of the invention, the stepped edge 18 (shown in FIG. 2), resulting from the mutual sliding of the laminations 4, is thereafter generally removed by trimming.

Another advantageous embodiment of the present method of heat shaping resin laminate sheets of the invention is shown in FIGS. 5 and 6, which show schematically in a cross-sectional view the bending device used for carrying out the embodiment of the invention in a partial representation, in two different phases of the bending process of the invention.

The bending device is a press, which has a press frame 19, on which is mounted the bottom part 20 of a bending tool traversed by a cooling medium. The bending face or surface 21 (face being taken in its general meaning) of this bending tool has a cylindrical surface, with generatrices of the cylindrical shell surface extending normal to the cross-sectional plane. There is further provided on the press frame 19 a table 22 for feeding the deformable resin laminate sheet 23 of the invention, as well as a vertically lowerable element 24 for holding down the sheet 23. The vertically lowerable die 25 supports the upper part 26 of the bending tool, which, analogously to part 20, is likewise cooled and has a cylindrical bending face 27.

To carry out the bending a strip-shaped area of sheet 23, designated area 29, is heated to 160°–170° C. in a first process step (not shown in the figures) and sheet 23 is then inserted into the bending tool on the table 22 in the direction of arrow 28 so that the heated strip-shaped area 29 to be shaped is brought into the position shown in FIG. 5. The lateral boundaries 30 of the deformation area 29 extend approximately normal to the cross-sectional plane.

Die 25 is next lowered, sheet 23 being thereby bent against the curved bending surface areas 31, 32 and, finally, in the last phase of the process shown in FIG. 6, sheet 23 is retained between the two bending surfaces 21 and 27, which serve in this phase as form-holding elements, until the thermoplastic binder contained in sheet 23 resolidifies. The contours of the cross-sections of the two bending surfaces 21 and 27 are so formed that in the position shown in FIG. 6 they form parallel curves (i.e. that they have the same center of curvature), with the result that in the above-mentioned cooling phase sheet 23 is held at a constant thickness in the deformation area. Due to the above-described form of the bending faces 21 and 27, and also to the fact that in cross-section the sheet contours have the same direction at both boundaries of the bending area, the result is that the total lengths of the shaped lamination area are the same for every lamination present and therefore no shear stress can occur in the sheet between the laminations in the bent state.

After cooling is completed, the press is opened, the sheet hold-down element 24 is released, and the finished shaped sheet 23' is removed from the bending device in the direction of arrow 28.

Various aspects of the present invention are conventional such as e.g. the dimensions and weights of the support webs, and of the thermoplastic binder sheets, the amounts of duroplastic binders for impregnating the support webs and various conditions relating to molding of the laminates and shaping of the deformable resin laminate sheet, such as temperature, time, pressure, etc.

The preceding specific embodiments are illustrative of the practice of the invention. It is to be understood, however, that other expediates known to those skilled in the art, or disclosed herein may be employed without departing from the spirit of the invention or the scope of the appended claims.

We claim:

1. The process of heat shaping at an elevated deformation temperature of a heat shapable resin laminate sheet over a deformation area of it wherein this deformation area does not coincide with the sheet edges at two boundaries which are at least substantially parallel to each other, and the shaping in the deformation area occurs by bending around two cylindrical surfaces, whose generatrices of which are parallel to each other or, respectively, to the parallel boundaries of the deformation area of the sheet, provided that, at least after the termination of the bending process, in the cross-section extending normal to the bending surface generatrices, the sum of the direction changes within the sheet caused by the deformation is zero at each of the two cross-section contours while the total lengths of the deformed lamination areas are the same for each lamination, the laminate including several heat-bonded support webs impregnated with thermosetting binders and molded at an elevated temperature, the deformation temperature being higher than the temperature utilized in molding the laminate sheet, the laminate sheet having a thickness of greater than 1.2 mm and a decorative surface on at least one side and comprising a plurality of individual laminations, each of which is formed separately of one or more support webs impregnated with post-forming, thermosetting binders, and of layers of thermoplastic binders arranged between the individual laminations and forming joints between them, the softening temperature or the melting temperatures of the thermoplastic binders being lower than the deformation temperature the bending process comprising (a) heating the heat shapable resin laminate sheet, the heat being applied at least over the deformation area to a temperature higher than the softening temperature or higher than the melting point temperature of the thermoplastic binder, (b) thereupon bending the sheet within the deformation area in a bending device around at least one cylindrical surface, the radius of which is less than 8 times the thickness of the sheet, whereby the laminations of the sheet shift relative to each other in the deformation area in the direction of the sheet surface, and (c) cooling the sheet after termination of the bending process, provided that during or after shaping and at least until the binder solidifies again during cooling separation of the joints formed by the binder is prevented.

2. The process of claim 1 wherein the thermoplastic binder is a non-hardening melt adhesive.

3. The process of claim 2 wherein the melt adhesive is polyamide based.

4. The process of claim 1 wherein the thermoplastic binder is novolacbased.

5. The process of claim 1 wherein the thermoplastic binder comprises an acrylonitrile-butadiene-styrene copolymer.

6. The process of claim 1 wherein the thermoplastic binder comprises a polyester.

* * * * *

UNITED STATES PATENT AND TRADEMARK OFFICE
CERTIFICATE OF CORRECTION

PATENT NO. : 4,750,961

DATED : June 14, 1988

INVENTOR(S) : GUENTHER PFLUG and GEORG PETERSHOFER

It is certified that error appears in the above-identified patent and that said Letters Patent is hereby corrected as shown below:

Claim 1 should read as follows:

A process of heat shaping at an elevated deformation temperature of a heat shapable resin laminate sheet including a plurality of individual laminations, the heat shaping being performed over a deformation area of the sheet wherein this deformation area does not coincide with the sheet edges at two boundaries which are at least substantially parallel to each other, and the shaping in the deformation area occurs by bending around two cylindrical surfaces, whose generatices of which are parallel to each other or, respectively, to the parallel boundaries of the deformation area of the sheet, provided that, at least after the termination of the bending process, in a cross-section extending normal to the bending surface generatices, the sum of the direction changes within the sheet caused by the deformation is zero at each of the two cross-section contours while the total lengths of the deformed lamination areas are the same for each lamination, the laminate including several heat-bonded support webs impregnated with thermosetting binders and molded at an elevated temperature, the deformation temperature being higher than the temperature utilized in molding the laminate sheet, the laminate sheet having a thickness of greater than 1.2 mm and a decorative surface on at least one side and comprising the said plurality of individual laminations, each of which is formed separately of one or more support webs impregnated with post-forming, thermosetting binders, and of layers of thermoplastic binders arranged between the individual laminations and forming joints between them, the softening temperature or the melting temperatures of the thermoplastic binders being lower than the deformation temperature the process comprising (a) heating the heat shapable resin laminate sheet, the heat being applied at least over the deformation area to a temperature higher than

UNITED STATES PATENT AND TRADEMARK OFFICE
CERTIFICATE OF CORRECTION

PATENT NO. : 4,750,961
DATED : June 14, 1988
INVENTOR(S) : GUENTHER PFLUG and GEORG PETERSHOFER It is certified that error appears in the above-identified patent and that said Letters Patent is hereby corrected as shown below:

the softening temperature or higher than the melting temperature of the thermoplastic binder, (b) thereupon bending the sheet within the deformation area in a bending device around at least two cylindrical surfaces the radii of which are less than 8 times the thickness of the sheet, whereby the laminations of the sheet shift relative to each other in the deformation area in the direction of the sheet surface, and (c) cooling the sheet after termination of the bending process, provided that during or after shaping and at least until the binder solidifies again during cooling separation of the joints formed by the binder is prevented.

On the Title Page, "[73] Assignee: Isovolta Isterreichische Isolierstoffwerke Aktiengesellschaft, Wiener Neudorf, Austria" should be deleted.

Signed and Sealed this

Eleventh Day of July, 1989

Attest:

DONALD J. QUIGG

Attesting Officer

Commissioner of Patents and Trademarks